United States Patent

[11] 3,534,718

| [72] | Inventor | Carl Pasquin |
| | | 520 Van Buren, Pueblo, Colorado 81005 |
| [21] | Appl. No. | 717,531 |
| [22] | Filed | April 1, 1968 |
| [45] | Patented | Oct. 20, 1970 |

[54] ROTATABLE VALVE FOR CONTROLLING HYDRAULIC OPERATION OF POPPET VALVES
1 Claim, 5 Drawing Figs.

[52] U.S. Cl. .................................................. 123/90.13, 137/625.24
[51] Int. Cl. .................................................. F24c 3/00
[50] Field of Search .......................... 123/90(E)(U.S. only), 90(E)Foreign); 137/625.24

[56] References Cited
UNITED STATES PATENTS

| 2,660,986 | 12/1953 | Ludeman | 123/90(E)UX |
| 2,827,884 | 3/1958 | Stivender | 123/90(E)UX |
| 2,915,052 | 12/1959 | Gullen | 123/90(E)UX |
| 2,661,724 | 12/1953 | Blenkle | 137/625.24 |

*Primary Examiner*—Benjamin W. Wyche
*Attorney*—Richard W. Hanes

ABSTRACT: A hydraulic valving device which is rotatable and includes two coplaner radial duct openings connected respectively to high and low hydraulic pressure sources and further includes a casing having a single opening therein, which is alternately presented to the high and low pressure valving ducts as the rotatable member is turned.

Patented Oct. 20, 1970
3,534,718
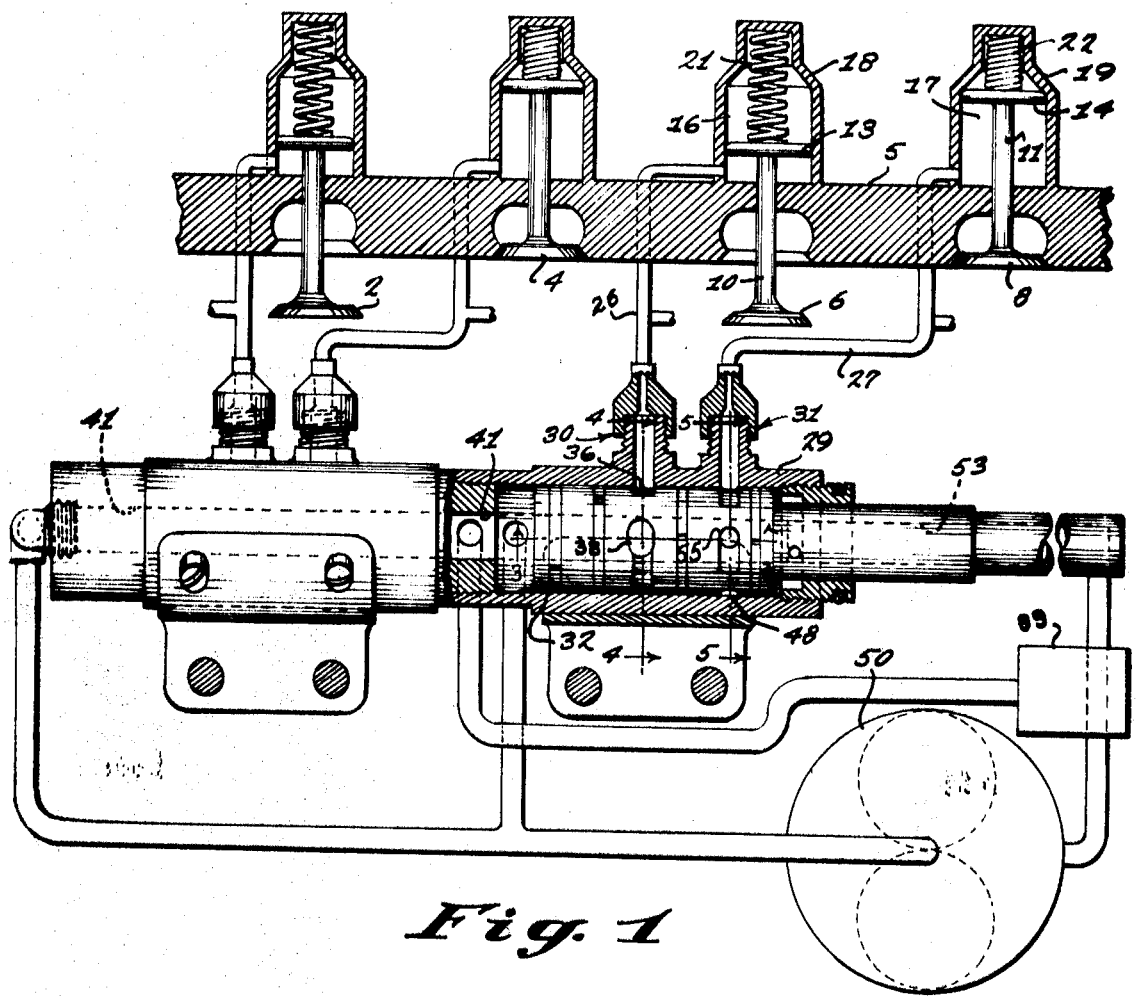
Fig. 1
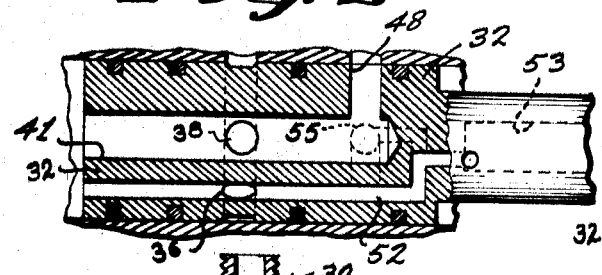
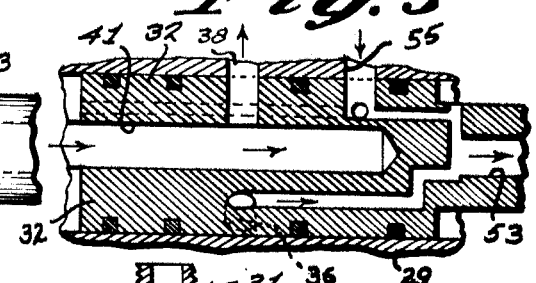
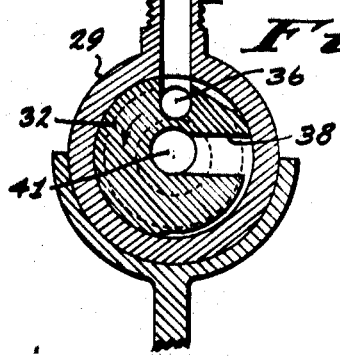
INVENTOR
CARL PASQUIN
BY
*Richard W. Hansen*
ATTORNEY

ROTATABLE VALVE FOR CONTROLLING HYDRAULIC OPERATION OF POPPET VALVES

The present invention relates to improvements in hydraulic valve systems for internal combustion engines.

The chief objective of the invention is to closely approach that ideal condition of engine operation wherein the cylinder valves open and close instantaneously and are always in a position of being fully open or fully closed regardless of engine operating speed.

Inclusive in the chief objective, but nevertheless important enough to specifically enumerate, a second objective of the invention is to provide a valve operating system which will reduce or eliminate "valve float" at high engine r.p.m.

Another objective of the invention is to provide a simplified valve system which, by its fundamental nature, will eliminate such conventional engine components as the cam shaft tappets, push rods, and rocker arms.

A still further object of the invention is to provide apparatus of the type described which will result in simplified adjustments and tuning and which will easily accommodate a complete change of apparatus to modify the operating characteristics of the engine.

Other and still further objects, features and advantages of the present invention will become apparent upon a reading of the detailed description of a preferred form of the invention taken in conjunction with the accompanying drawings in which:

FIG. 1 is a diagramatic view in cross section of four poppet valves of an internal combustion engine shown connected by conduit to the valving apparatus of the present invention, a portion of which is broken away and shown in cross section;

FIG. 2 is an enlarged fragmentary cross-sectional view of the rotating valve of the apparatus of the present invention;

FIG. 3 is an enlarged fragmentary cross-sectional view of the rotating valve taken along lines 3—3 of FIG. 1. FIG. 3 is a cross section taken 90° from the cross section of FIG. 2;

FIG. 4 is a cross-sectional view taken along lines 4—4 of FIG. 1; and

FIG. 5 is a cross-sectional view taken along lines 5—5 of FIG. 1.

Basically, the apparatus of the invention comprises a cylinder having a rotatable ported cylinder therein, which cylinder is rotated at one-half engine crankshaft speed by an appropriate drive coupling. A source of constant fluid pressure is provided to the interior of the cylinder which is directed at specified portions of each revolution through the ports and conduits to a piston-cylinder combination connected to the push rod of each engine valve. Through other ports in the rotating cylinder, hydraulic fluid is directed back to the low pressure side of the fluid pump. The hydraulic system associated with each engine valve is connected by a conduit and coupling through the outside cylinder of the apparatus so that as the inside cylinder, or rotating "valve" turns, the high pressure port will be matched to the coupling for that fraction of the total rotation as will match the time desired for keeping the engine valve closed. The exhaust or low pressure port will be matched to the coupling for that period of time required to empty the hydraulic fluid from the piston cylinder which operates the engine valve. For that portion of the rotation of the rotating cylinder or valve where there is no port in opposing relation to the coupling, the engine valve remains in the open position.

The valving apparatus of the present invention requires one high pressure port and one low pressure port for each valve, however, the number of these pairs of ports is limited only by the physical length of the rotating cylinder.

Referring now to the drawings for a detailed description of the preferred form of the invention, and in particular to FIG. 1 thereof, it will be seen that the four poppet valves 2, 4, 6 and 8 associated with two engine cylinders (not shown) of an internal combustion engine are diagramatically illustrated as being carried by an engine block 5. For descriptive purpose, only two of the four valves need be considered and those valves 6 and 8 will be assumed to be the intake and exhaust valves respectively of a single cylinder.

Each of the valves 6 and 8 is provided with a valve stem 10 and 11 respectively at the upper end of which is disposed valve piston members 13 and 14 which are integral with the said valve stems. Each of the pistons are slideable inside the chamber 16 and 17 of a valve piston cylinder 18 and 19. To furnish bias for opening the valves, compression springs 21 and 22 are positioned between the top of the valve piston cylinder 18 and 19 and the valve piston 13 and 14. Each of the said valve piston chambers is connected to a source of hydraulic fluid in order that the valve may be "closed" by subjecting the underside of the valve piston 13 and 14 to hydraulic pressure which exceeds the force of the respective compression spring 21 or 22.

Intake and exhaust hydraulic piping tubes 26 and 27 interconnect the chambers 16 and 17 with the interior of a cylindrical bearing 29 through appropriate couplings and nipples 30 and 31. Rotatably disposed inside the bearing 29 is a cylindrical valve member 32 whose function it is to present alternately to each of the piping tube openings a source of high pressure hydraulic fluid and a low pressure reservoir, that is to say, the valve 32 acts to switch each of the piping lines from high to low hydraulic pressure at a speed dependent on the rotational speed of the valve.

As best seen in the cross-sectional views of FIGS. 4 and 5, the valve 32 is provided with a plurality of pairs of radial bores at approximately 90° radial spacing. Each pair of said radial bores in the cylindrical valve 32 is located in the same transverse plane as would correspond to the position of the pipe couplings 30 and 31. Referring to FIG. 4, the bore 36 seen positioned beneath the coupling 30 may be referred to as the exhaust port and the other radial bore 38 may be referred to as the intake port. The intake port 38 communicates with an axial bore 41 of the valve 32 which bore is connected to a source of high pressure hydraulic fluid such as pump 50. As seen in FIGS. 2 and 3, the central bore 41 extends lengthwise of the rotatable cylinder in order to communicate with the intake port 48 associated with the exhaust valve 8. The exhaust port 36 interconnects with a chamber 52, also within the rotatable valve 32, which communicates with a similar exhaust port 55 associated with valve 8. The chamber 52 is extended to a longitudinal bore 53 in the reduced diameter end of the rotatable valve 32 which bore dumps into a reservoir 39 of hydraulic fluid on the low pressure side of the pump 50.

In the drawing of FIG. 1, the portion of the valving apparatus which is shown broken away is similar to that provided for valves 2 and 4.

Having thus described the several useful and novel features of the Rotatable Valve for Controlling Hydraulic Operation of Poppet Valves of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. A poppet valve operating system comprising in combination:
 a cylindrical casing having at least one peripheral opening;
 valve means rotatably disposed within said casing, said valve means including:
 a solid cylindrical member having first and second longitudinal bores within said member;
 at least one pair of coplaner radial bores extending to the surface of the said cylindrical member; at least two peripheral rabbits in the cylindrical member, each of which communicates with one of said bores at its intersection with the surface of the cylindrical member;

conduit means interior of the cylindrical member interconnecting the first of the longitudinal bores with one of said radial bores and the second of the longitudinal bores with the other radial bore, said cylindrical member being positioned in said casing so that the said opening in the casing is aligned with the longitudinal position of said radial bores;

a source of high pressure hydraulic fluid;

conduit means interconnecting said high pressure source and said first bore;

a low pressure hydraulic dump reservoir;

means interconnecting said reservoir with said second bore;

hydraulic piston means including a piston rod, piston, and piston chamber;

poppet valve means having a valve stem which is common with the said piston rod;

spring means disposed in said piston chamber on one side of said piston and biasing the valve means to one position; and conduit means interconnecting said piston chamber and the said opening in the casing.